United States Patent
Zhang et al.

(10) Patent No.: US 12,008,264 B2
(45) Date of Patent: Jun. 11, 2024

(54) SMART NETWORK INTERFACE CONTROLLER HOST STORAGE ACCESS

(71) Applicant: Dell Products L.P., Round Rock, TX (US)

(72) Inventors: Zheng Zhang, Shanghai (CN); Zhuo Zhang, Shanghai (CN); Neil Tang, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/576,601

(22) Filed: Jan. 14, 2022

(65) Prior Publication Data

US 2023/0195378 A1 Jun. 22, 2023

(30) Foreign Application Priority Data

Dec. 22, 2021 (CN) .......................... 202111585673.4

(51) Int. Cl.
*G06F 3/06* (2006.01)
*G06F 1/26* (2006.01)

(52) U.S. Cl.
CPC .............. *G06F 3/0659* (2013.01); *G06F 1/26* (2013.01); *G06F 3/0608* (2013.01); *G06F 3/0664* (2013.01); *G06F 3/067* (2013.01)

(58) Field of Classification Search
CPC .... G06F 3/0659; G06F 3/0608; G06F 3/0664; G06F 3/067; G06F 1/26
See application file for complete search history.

(56) References Cited

U.S. PATENT DOCUMENTS

| | | | |
|---|---|---|---|
| 7,954,006 B1* | 5/2011 | Mangipudi | G06F 1/30 713/340 |
| 10,591,979 B2* | 3/2020 | Kacker | G06F 1/263 |
| 2006/0206666 A1* | 9/2006 | Lambert | G06F 3/0605 711/115 |
| 2010/0296647 A1* | 11/2010 | Chan | H04L 67/56 379/413.02 |
| 2015/0094868 A1* | 4/2015 | Diab | G05B 19/4185 700/286 |
| 2017/0277605 A1* | 9/2017 | Petersen | G06F 11/2015 |
| 2020/0042472 A1* | 2/2020 | Koker | G06F 13/4068 |
| 2023/0085040 A1* | 3/2023 | Scholbrock | G06F 3/0617 711/154 |

* cited by examiner

*Primary Examiner* — Nanci N Wong
(74) *Attorney, Agent, or Firm* — Jackson Walker L.L.P.

(57) ABSTRACT

An information handling system may include a host system including at least one processor, a host physical storage resource, a network interface, and a control circuit. The network interface may be configured to, in response to the host system being powered down: transmit one or more signals to the control circuit, wherein the one or more signals are configured to cause the control circuit to supply power and data connectivity from the network interface to the host physical storage resource; and provide access to the host physical storage resource from a remote network information handling system while the host system is powered down.

15 Claims, 3 Drawing Sheets

SMART NETWORK INTERFACE CONTROLLER HOST STORAGE ACCESS

TECHNICAL FIELD

The present disclosure relates in general to information handling systems, and more particularly to methods and systems for allowing access to host storage resources from a smart network interface controller.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In some computing applications, an information handling system may include a hypervisor for hosting one or more virtual resources such as virtual machines (VMs). A hypervisor may comprise software and/or firmware generally operable to allow multiple virtual machines and/or operating systems to run on a single information handling system at the same time. This operability is generally allowed via virtualization, a technique for hiding the physical characteristics of computing system resources (e.g., physical hardware of the computing system) from the way in which other systems, applications, or end users interact with those resources. Thus, a virtual machine may comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

In other applications, an information handling system may be used in a "bare metal" configuration in which only one operating system is installed, and the hypervisor and virtual resources are not needed.

In either scenario, a network interface of the information handling system may comprise a smart network interface card or "SmartNIC" and/or a data processing unit (DPU), which may offer capabilities not found in traditional NICs. For purposes of this disclosure, the terms "SmartNIC" and "DPU" may be used interchangeably.

There is currently no effective method to access the physical storage resources of a host information handling system from its SmartNIC. This limitation restricts some capabilities of SmartNICs, e.g., for bare-metal services. For example, if SmartNICs could be used to manipulate the local storage on the host, then various bare-metal services could become more powerful in many aspects, such as in the context of OS deployment, data migration, etc.

Embodiments of this disclosure thus may allow access to host storage devices from a SmartNIC via a sideband channel. The sideband channel can be provided by a Non-Volatile Memory Express (NVMe) backplane as discussed herein, which may control the PCIe data paths and the power distribution for connected storage resources. With this approach, the host storage can be accessed by the SmartNIC for a wide range of services with low power consumption in some embodiments.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with existing SmartNIC technology within an information handling system may be reduced or eliminated.

In accordance with embodiments of the present disclosure, an information handling system may include a host system including at least one processor, a host physical storage resource, a network interface, and a control circuit. The network interface may be configured to, in response to the host system being powered down: transmit one or more signals to the control circuit, wherein the one or more signals are configured to cause the control circuit to supply power and data connectivity from the network interface to the host physical storage resource; and provide access to the host physical storage resource from a remote network information handling system while the host system is powered down.

In accordance with these and other embodiments of the present disclosure, a method may include, in response to a host system being powered down, a network interface of the host system transmitting one or more signals to a control circuit, wherein the one or more signals are configured to cause the control circuit to supply power and data connectivity from the network interface to a host physical storage resource of the host system; and the network interface providing access to the host physical storage resource from a remote network information handling system while the host system is powered down.

In accordance with these and other embodiments of the present disclosure, an article of manufacture may include a non-transitory, computer-readable medium having instructions thereon that are executable by a processor of a network interface of an information handling system for: in response to a host system that includes the network interface being powered down, transmitting one or more signals to a control circuit, wherein the one or more signals are configured to cause the control circuit to supply power and data connectivity from the network interface to a host physical storage resource of the host system; and providing access to the host physical storage resource from a remote network information handling system while the host system is powered down.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
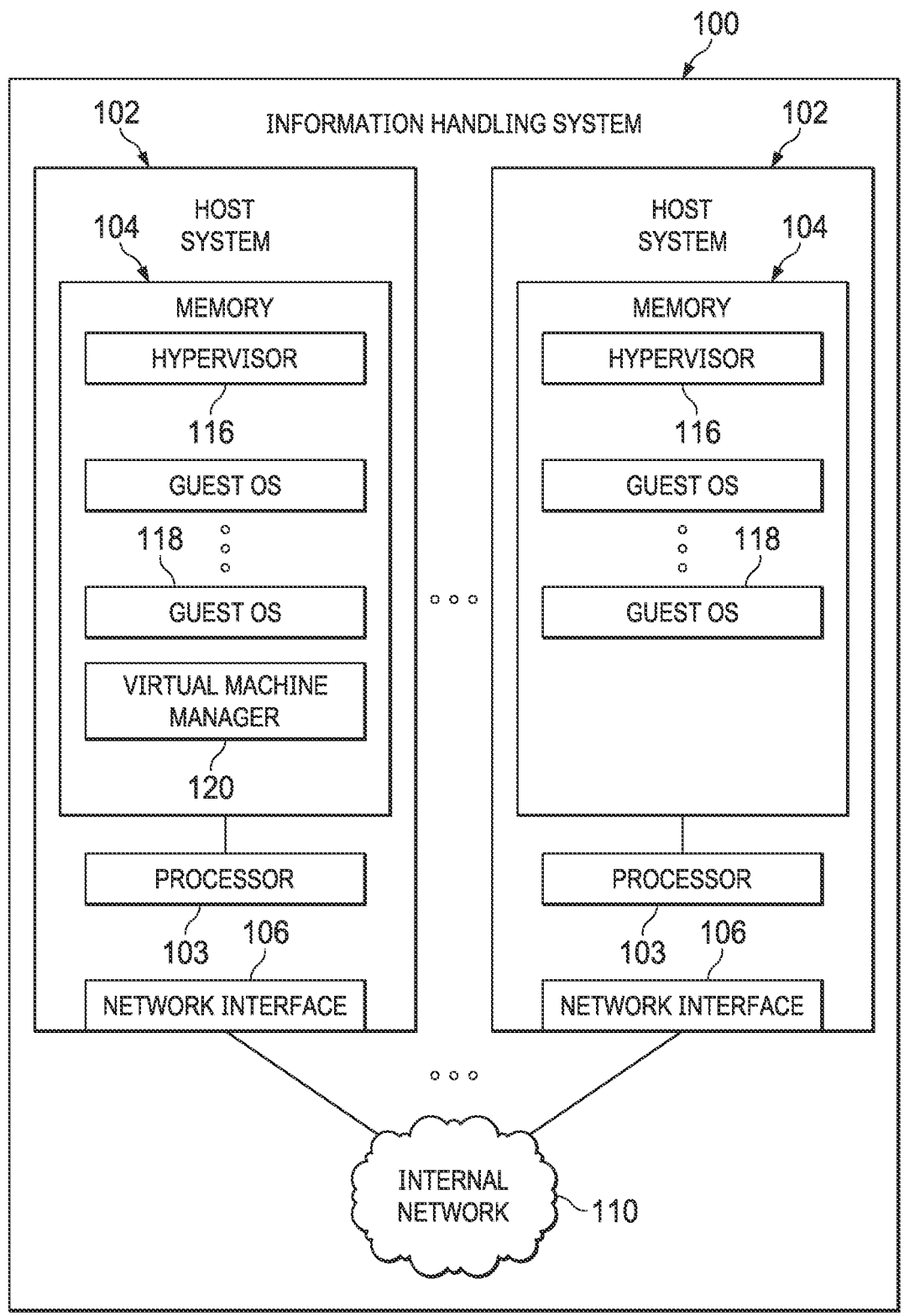
FIG. 1 illustrates a block diagram of selected components of an example information handling system, in accordance with embodiments of the present disclosure.

Preferred embodiments and their advantages are best understood by reference to FIGS. 1 through 4, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/ or flash memory; communications media such as wires, optical fibers, microwaves, radio waves, and other electromagnetic and/or optical carriers; and/or any combination of the foregoing. Physical computer-readable media such as disk drives, solid-state drives, non-volatile memory, etc. may also be referred to herein as "physical storage resources."

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/ or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of selected components of an example information handling system 100 having a plurality of host systems 102, in accordance with embodiments of the present disclosure. As shown in FIG. 1, information handling system 100 may include a plurality of host systems 102 coupled to one another via an internal network 110.

In some embodiments, information handling system 100 may include a single chassis housing a plurality of host systems 102. In other embodiments, information handling system 100 may include a cluster of multiple chassis, each with one or more host systems 102. In yet other embodiments, host systems 102 may be entirely separate information handling systems, and they may be coupled together via an internal network or an external network such as the Internet.

In some embodiments, a host system 102 may comprise a server (e.g., embodied in a "sled" form factor). In these and other embodiments, a host system 102 may comprise a personal computer. In other embodiments, a host system 102 may be a portable computing device (e.g., a laptop, notebook, tablet, handheld, smart phone, personal digital assistant, etc.). As depicted in FIG. 1, information handling system 100 may include a processor 103, a memory 104 communicatively coupled to processor 103, and a network interface 106 communicatively coupled to processor 103. For the purposes of clarity and exposition, in FIG. 1, each host system 102 is shown as comprising only a single processor 103, single memory 104, and single network interface 106. However, a host system 102 may comprise any suitable number of processors 103, memories 104, and network interfaces 106.

A processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in a memory 104 and/or other computer-readable media accessible to processor 103.

A memory 104 may be communicatively coupled to a processor 103 and may include any system, device, or apparatus configured to retain program instructions and/or data for a period of time (e.g., computer-readable media). A memory 104 may include RAM, EEPROM, a PCMCIA card, flash memory, magnetic storage, opto-magnetic storage, or any suitable selection and/or array of volatile or non-volatile memory that retains data after power to information handling system 100 is turned off.

As shown in FIG. 1, a memory 104 may have stored thereon a hypervisor 116 and one or more guest operating systems (OS) 118. In some embodiments, hypervisor 116 and one or more of guest OSes 118 may be stored in a computer-readable medium (e.g., a local or remote hard disk drive) other than a memory 104 which is accessible to processor 103. Each guest OS 118 may also be referred to as a "virtual machine."

A hypervisor 116 may comprise software and/or firmware generally operable to allow multiple virtual machines and/or operating systems to run on a single computing system (e.g., an information handling system 100) at the same time. This operability is generally allowed via virtualization, a technique for hiding the physical characteristics of computing system resources (e.g., physical hardware of the computing system) from the way in which other systems, applications, or end users interact with those resources. A hypervisor 116 may be one of a variety of proprietary and/or commercially available virtualization platforms, including without limitation, VIRTUALLOGIX VLX FOR EMBEDDED SYSTEMS, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP.

In one embodiment, a hypervisor 116 may comprise a specially-designed OS with native virtualization capabilities. In another embodiment, a hypervisor 116 may comprise a standard OS with an incorporated virtualization component for performing virtualization.

In another embodiment, a hypervisor 116 may comprise a standard OS running alongside a separate virtualization application. In this embodiment, the virtualization application of the hypervisor 116 may be an application running above the OS and interacting with computing system resources only through the OS. Alternatively, the virtualization application of a hypervisor 116 may, on some levels, interact indirectly with computing system resources via the OS, and, on other levels, interact directly with computing system resources (e.g., similar to the way the OS interacts directly with computing system resources, or as firmware running on computing system resources). As a further alternative, the virtualization application of a hypervisor 116 may, on all levels, interact directly with computing system resources (e.g., similar to the way the OS interacts directly with computing system resources, or as firmware running on computing system resources) without utilizing the OS, although still interacting with the OS to coordinate use of computing system resources.

As stated above, a hypervisor 116 may instantiate one or more virtual machines. A virtual machine may comprise any program of executable instructions, or aggregation of programs of executable instructions, configured to execute a guest OS 118 in order to act through or in connection with a hypervisor 116 to manage and/or control the allocation and usage of hardware resources such as memory, CPU time, disk space, and input and output devices, and provide an interface between such hardware resources and application programs hosted by the guest OS 118. In some embodiments, a guest OS 118 may be a general-purpose OS such as WINDOWS or LINUX, for example. In other embodiments, a guest OS 118 may comprise a specific- and/or limited-purpose OS, configured so as to perform application-specific functionality (e.g., persistent storage).

At least one host system 102 in information handling system 100 may have stored within its memory 104 a virtual machine manager 120. A virtual machine manager 120 may comprise software and/or firmware generally operable to manage individual hypervisors 116 and the guest OSes 118 instantiated on each hypervisor 116, including controlling migration of guest OSes 118 between hypervisors 116. Although FIG. 1 shows virtual machine manager 120 instantiated on a host system 102 on which a hypervisor 116 is also instantiated, in some embodiments virtual machine manager 120 may be instantiated on a dedicated host system 102 within information handling system 100, or a host system 102 of another information handling system 100.

A network interface 106 may include any suitable system, apparatus, or device operable to serve as an interface between an associated information handling system 100 and internal network 110. A network interface 106 may enable its associated information handling system 100 to communicate with internal network 110 using any suitable transmission protocol (e.g., TCP/IP) and/or standard (e.g., IEEE 802.11, Wi-Fi). In certain embodiments, a network interface 106 may include a physical network interface card (NIC). In the same or alternative embodiments, a network interface 106 may be configured to communicate via wireless transmissions. In the same or alternative embodiments, a network interface 106 may provide physical access to a networking medium and/or provide a low-level addressing system (e.g., through the use of Media Access Control addresses). In some embodiments, a network interface 106 may be implemented as a local area network ("LAN") on motherboard ("LOM") interface. A network interface 106 may comprise one or more suitable NICs, including without limitation, mezzanine cards, network daughter cards, etc.

In some embodiments, a network interface 106 may comprise a SmartNIC and/or a DPU. In addition to the stateful and custom offloads a SmartNIC or DPU may provide, it may have an independent management domain with a separate operating system, independent credentials, and independent remote access. Accordingly, network interface 106 may include its own specialized processor and memory.

In addition to processor 103, memory 104, and network interface 106, a host system 102 may include one or more other information handling resources.

Internal network 110 may be a network and/or fabric configured to communicatively couple information handling systems to each other. In certain embodiments, internal network 110 may include a communication infrastructure, which provides physical connections, and a management layer, which organizes the physical connections of host systems 102 and other devices coupled to internal network 110. Internal network 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Internal network 110 may transmit data using any storage and/or communication protocol, including without limitation, Fibre Channel, Fibre Channel over Ethernet (FCoE), Small Computer System Interface (SCSI), Internet SCSI (iSCSI), Frame Relay, Ethernet Asynchronous Transfer Mode (ATM), Internet protocol (IP), or other packet-based protocol, and/or any combination thereof. Network 110 and its various components may be implemented using hardware, software, or any combination thereof.

Figure 2:
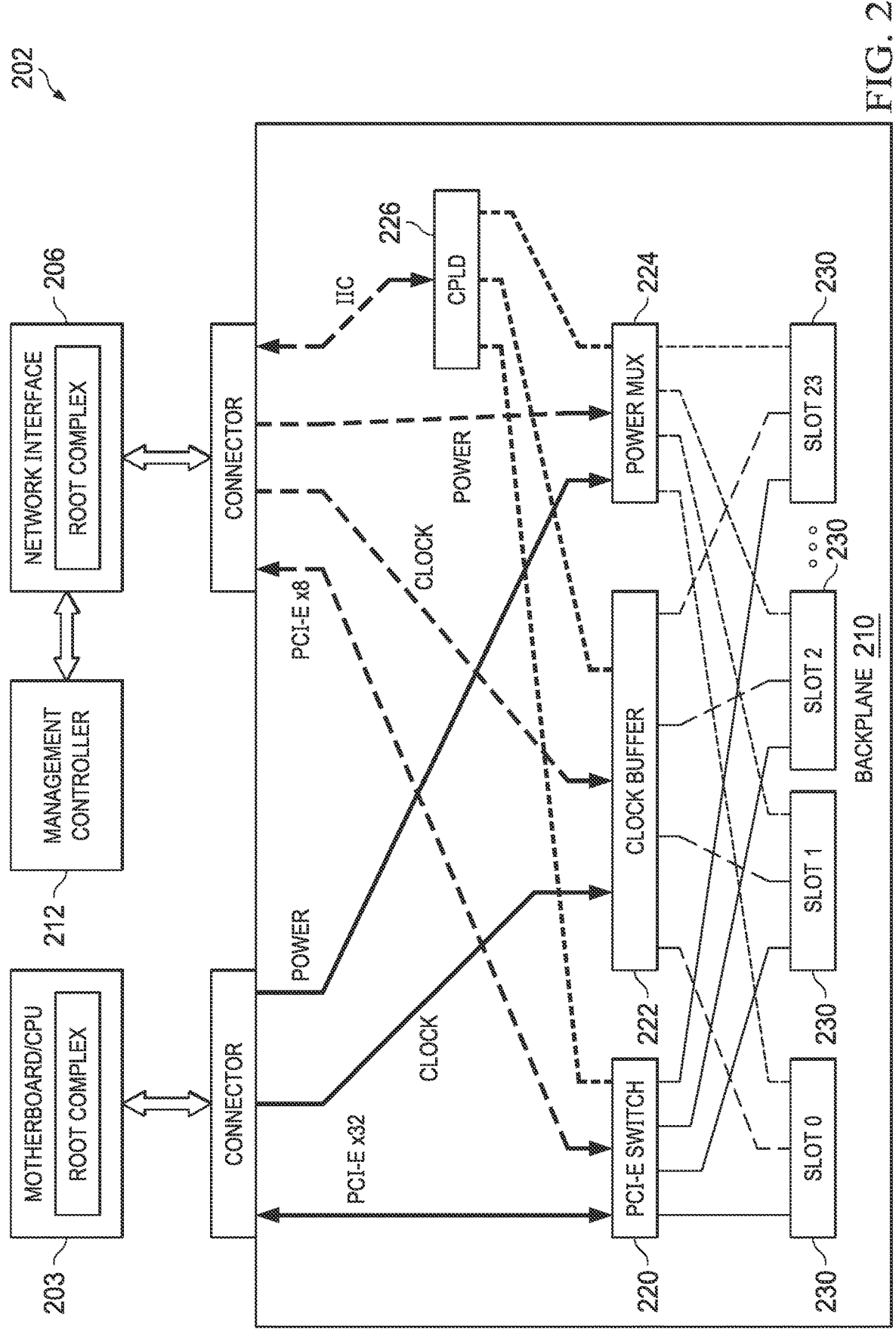
FIG. 2 illustrates a block diagram of selected components of an example information handling system, in accordance with embodiments of the present disclosure.

Turning now to FIG. 2, a block diagram of selected components of an information handling system 202 is shown, according to some embodiments. Information handling system 202 may include a backplane 210 which may be communicatively coupled to a motherboard and processor 203, which may include a PCIe root complex. For simplicity, motherboard and processor 203 may be referred to collectively herein simply as "processor 203" or as the "host system." Backplane 210 may also be communicatively coupled to a network interface 206 such as a SmartNIC. Network interface 206 may include various specialized elements such as processors, memory, etc. As shown, network interface 206 may also include another PCIe root complex. Information handling system 202 may also include a management controller 212 such as a BMC, which may be communicatively coupled to network interface 206, as well as other components in various embodiments.

In some embodiments, the slots 230 of backplane 210 may be used to house one or more physical storage resources such as NVMe drives, also referred to herein as host storage resources. Backplane 210 may also include a complex programmable logic device (CPLD) 226, discussed in more detail below.

As mentioned above, embodiments may allow access to the host storage resources from network interface 206 via a sideband channel. Thus an administrator may use network interface 206 to access the host storage resources even when the host system is powered down. A sideband channel may be provided by backplane 210 as shown in FIG. 2, which may control the PCIe data paths, clock signals, and power distribution for any or all of the connected storage resources.

In some embodiments, network interface 206 may couple to backplane 210 via one or more cables that include a PCIe connection (e.g., x4 or x8 lanes), a clock connection, a power connection, and an I²C bus.

As shown, processor 203 and network interface 206 may include two independent PCIe root complexes. Typically, however, only one of the root complexes can work as the upstream port of the connected host storage resources at any given time. Thus all of the downstream and upstream PCIe ports may be connected with a configurable PCIe switch 220, which may allow for port assignment to be changed dynamically between processor 203 and network interface 206.

Backplane 210 may include a clock buffer 222 to provide clock signals alternately from either processor 203 or network interface 206 to the host storage resources. Similarly, backplane 210 may include a power MUX 224 to provide power alternately from either processor 203 or network interface 206 to some or all of the host storage resources.

Thus when processor 203 is powered on and active, the storage resources may receive PCIe connectivity, clock signals, and power from one connector that is associated with processor 203. When processor 203 is inactive, the storage resources may receive PCIe connectivity, clock signals, and power from a different connector that is associated with network interface 206.

Network interface 206 may work independently even if the motherboard and processor 203 are powered down to provide the accessibility of out-of-band management. In this mode, there is often no need to access all of the storage resources simultaneously, and so the power source associated with network interface 206 may be sized to sustain one or a small number of drives in some embodiments. Network interface 206 may access storage resources as needed by changing settings of power MUX 224 to redirect power to the host storage resources that are to be accessed at any given time.

Figure 3:
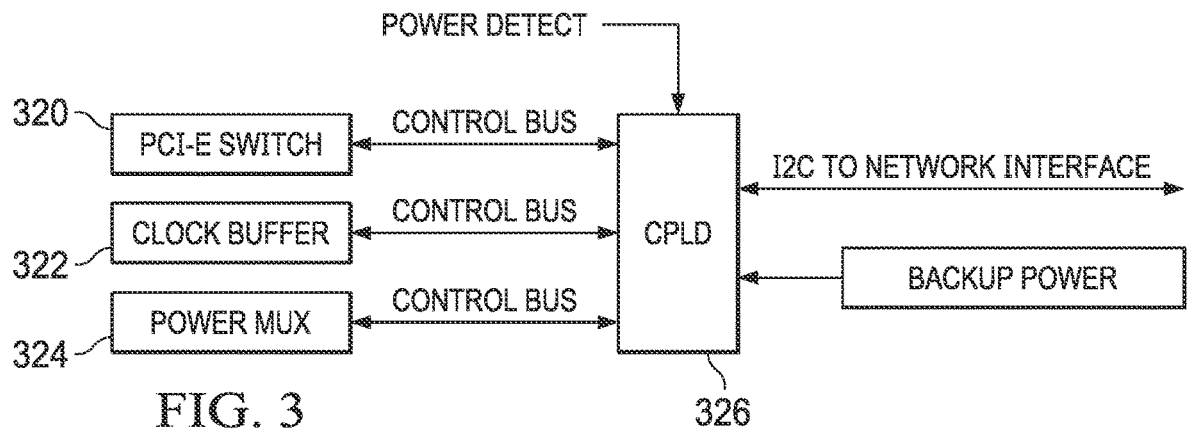
FIG. 3 illustrates a block diagram of example control circuitry, in accordance with embodiments of the present disclosure.
Figure 4:
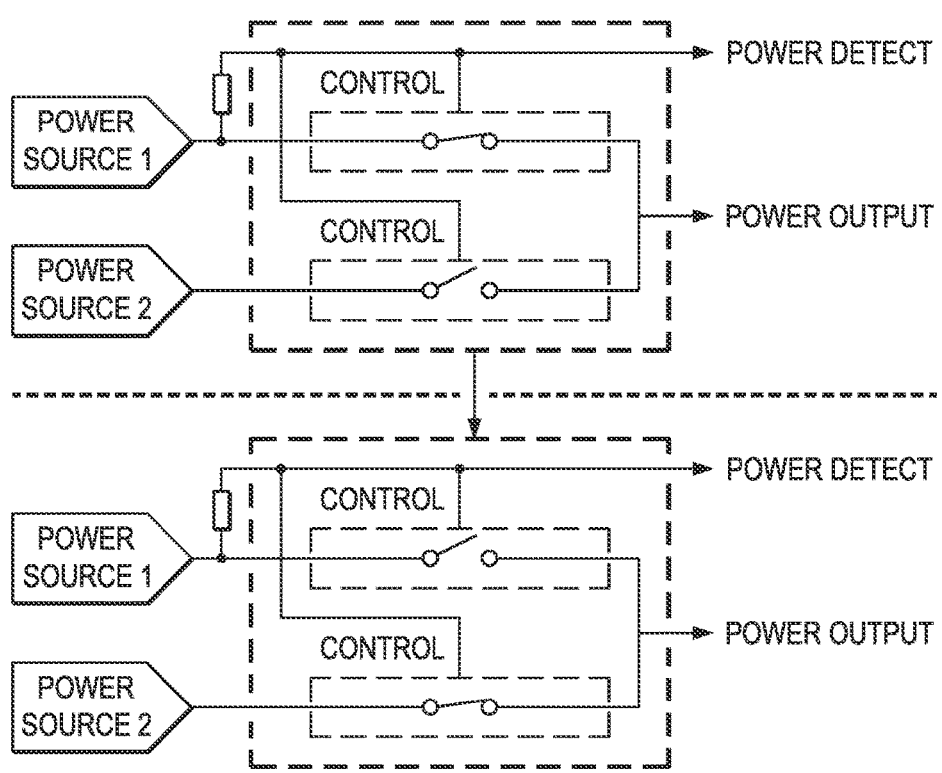
FIG. 4 illustrates a block diagram of an example power detection and switching circuit, in accordance with embodiments of the present disclosure.

Turning now to FIG. 3, example control circuitry including CPLD 326 is shown. CPLD 326 may be used to implement functionality similar or identical to CPLD 226 in FIG. 2 in some embodiments.

As shown, the handover between in-band communications via processor 203 and sideband communications via network interface 206 may be implemented via CPLD 326. When the host system is powered down, a power detection and switch circuit (discussed in more detail below with respect to FIG. 4) may switch the power source for the host storage resources from host power to power via the network interface. The power detection and switch circuit may also send a signal to CPLD 326. Based on such signal, CPLD 326 may switch the PCIe switch 320, clock buffer 322, and power MUX 324 to the ports associated with the network interface.

CPLD 326 may also communicate with the network interface via the I2C bus. The network interface may send I2C commands to CPLD 326 to change configuration settings of PCIe switch 320, clock buffer 322, and power MUX 324, for example. Furthermore, the network interface may query hardware information (e.g., drive slot information) from CPLD 326 before operating the host storage resources. Once the host system is powered back up, CPLD 326 may revert these changes to allow the host storage resources to be powered and controlled by the host system.

While the host system is powered down, CPLD 326 and other circuitry may be powered via a small backup power source, which may be provided by the network interface.

As noted above, FIG. 4 provides an example of a power detection and switch circuit 400. Power source 1 (e.g., host power) may be the default power source. When power source 1 is available, the power detect signal is asserted, and control circuit (e.g., circuitry including the CPLD from FIG. 3) may ensure that the switch from power source 1 to the power output is closed, and the switch from power source 2 (e.g., power via the network interface) is open.

When the power detect signal is de-asserted (e.g., when the host system powers down), circuit 400 may open the switch from power source 1 and close the switch from power source 2.

Thus embodiments of this disclosure may allow for many capabilities. As one example, deployment of an OS may be enabled via a network interface. For example, while the host system is powered down, a small amount of power for a control circuit, PCIe switch, and any related components may be provided via the network interface. When needed, the control circuit may switch the upstream PCIe port and the clock source for a storage resource to the network interface. The network interface may query hardware information from the control circuit via I2C, then send a command to the control circuit for enabling the power port on a given host storage resource. The network interface may then discover the connected drive on the PCIe bus when it powers up.

The network interface may write the OS files to the connected storage resource via the NVMe interface, then issue an NVMe command to turn off the storage resource safely. The network interface may send a command to the control circuit for disabling the power port on the storage resource when the task is complete.

When the host system powers up, the new OS may boot up.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. A method comprising:
  in response to a host system being powered down, a network interface of the host system transmitting one or more signals to a control circuit, wherein the host system includes a first Peripheral Component Interconnect Express (PCIe) root complex, wherein the network interface includes a second PCIe root complex, wherein the one or more signals are configured to cause the control circuit to supply power and data connectivity from the network interface to a host physical storage resource of the host system, wherein the data connectivity is via the second PCIe root complex, and wherein the host physical storage resource is a Non-Volatile Memory Express (NVMe) drive; and
  the network interface providing access to the host physical storage resource from a remote network information handling system while the host system is powered down.

2. The method of claim 1, wherein the data connectivity includes a clock signal, and wherein the host system includes a clock buffer configured to provide the clock signal to the host physical storage resource alternately from the host system or from the network interface.

3. The method of claim 1, further comprising, in response to the host system being powered up, the network interface transmitting one or more second signals to the control circuit, wherein the one or more second signals are configured to cause the control circuit to supply power and data connectivity from the host system to the host physical storage resource.

4. The method of claim 1, wherein the control circuit includes a complex programmable logic device (CPLD).

5. The method of claim 1, wherein the host system includes a plurality of host physical storage resources, and wherein the control circuit is configured to supply power and data connectivity from the network interface to a selected subset of the plurality of host physical storage resources.

6. An article of manufacture comprising a non-transitory, computer-readable medium having instructions thereon that are executable by a processor of a network interface of an information handling system for:
  in response to a host system that includes the network interface being powered down, transmitting one or more signals to a control circuit, wherein the host system includes a first Peripheral Component Interconnect Express (PCIe) root complex, wherein the network interface includes a second PCIe root complex, wherein the one or more signals are configured to cause the control circuit to supply power and data connectivity from the network interface to a host physical storage resource of the host system, wherein the data connectivity is via the second PCIe root complex, and wherein the host physical storage resource is a Non-Volatile Memory Express (NVMe) drive; and
  providing access to the host physical storage resource from a remote network information handling system while the host system is powered down.

7. The article of claim 6, wherein the data connectivity includes a clock signal, and wherein the host system includes a clock buffer configured to provide the clock signal to the host physical storage resource alternately from the host system or from the network interface.

8. The article of claim 6, wherein, in response to the host system being powered up, the network interface is configured to transmit one or more second signals to the control circuit, wherein the one or more second signals are configured to cause the control circuit to supply power and data connectivity from the host system to the host physical storage resource.

9. The article of claim 6, wherein the control circuit includes a complex programmable logic device (CPLD).

10. The article of claim 6, wherein the host system includes a plurality of host physical storage resources, and wherein the control circuit is configured to supply power and data connectivity from the network interface to a selected subset of the plurality of host physical storage resources.

11. An information handling system comprising:
a host system including at least one processor and a first Peripheral Component Interconnect Express (PCIe) root complex;
a host physical storage resource, wherein the host physical storage resource is a Non-Volatile Memory Express (NVMe) drive;
a network interface including a second PCIe root complex; and
a control circuit;
wherein the network interface is configured to, in response to the host system being powered down:
transmit one or more signals to the control circuit, wherein the one or more signals are configured to cause the control circuit to supply power and data connectivity from the network interface to the host physical storage resource, wherein the data connectivity is via the second PCIe root complex; and
provide access to the host physical storage resource from a remote network information handling system while the host system is powered down.

12. The information handling system of claim 11, wherein the data connectivity includes a clock signal, and wherein the host system includes a clock buffer configured to provide the clock signal to the host physical storage resource alternately from the host system or from the network interface.

13. The information handling system of claim 11, wherein, in response to the host system being powered up, the network interface is configured to transmit one or more second signals to the control circuit, wherein the one or more second signals are configured to cause the control circuit to supply power and data connectivity from the host system to the host physical storage resource.

14. The information handling system of claim 11, wherein the control circuit includes a complex programmable logic device (CPLD).

15. The information handling system of claim 11, wherein the host system includes a plurality of host physical storage resources, and wherein the control circuit is configured to supply power and data connectivity from the network interface to a selected subset of the plurality of host physical storage resources.

* * * * *